US008381438B2

(12) United States Patent
Van Duijn et al.

(10) Patent No.: US 8,381,438 B2
(45) Date of Patent: Feb. 26, 2013

(54) OXYGEN-CONTROLLED PRIMING OF SEED

(75) Inventors: Albert Van Duijn, Oegstgeest (NL); Johan Van Asbrouck, Phichit (TH)

(73) Assignee: Fytagoras, Leiden (NL)

( * ) Notice: Subject to any disclaimer, the term of this patent is extended or adjusted under 35 U.S.C. 154(b) by 243 days.

(21) Appl. No.: 12/663,996

(22) PCT Filed: Jun. 12, 2008

(86) PCT No.: PCT/NL2008/050370
§ 371 (c)(1),
(2), (4) Date: Apr. 12, 2010

(87) PCT Pub. No.: WO2008/153388
PCT Pub. Date: Dec. 18, 2008

(65) Prior Publication Data
US 2010/0186297 A1    Jul. 29, 2010

(30) Foreign Application Priority Data
Jun. 12, 2007  (EP) .................................... 07110105

(51) Int. Cl.
*A01C 1/00*    (2006.01)
(52) U.S. Cl. .................. 47/58.1 SE; 47/56; 47/56.1 R
(58) Field of Classification Search ............... 47/1.01 R, 47/56, 58.1 R, 58.1 SE, 58.1 FV, 59 S, 60, 47/61
See application file for complete search history.

(56) References Cited

U.S. PATENT DOCUMENTS

| | | | | |
|---|---|---|---|---|
| 4,715,143 A * | 12/1987 | Redenbaugh et al. | ......... | 47/57.6 |
| 4,769,945 A * | 9/1988 | Motoyama et al. | ............ | 47/57.6 |
| 4,808,430 A * | 2/1989 | Kouno | ................ | 427/4 |
| 4,879,839 A * | 11/1989 | Gago et al. | ....................... | 47/57.6 |
| 5,010,685 A * | 4/1991 | Sakamoto et al. | ............. | 47/57.6 |
| 5,044,116 A * | 9/1991 | Gago et al. | ....................... | 47/57.6 |
| 5,666,762 A | 9/1997 | Carlson et al. | | |
| 7,168,205 B2 * | 1/2007 | Hartle et al. | ................... | 47/57.6 |
| 7,356,965 B2 * | 4/2008 | Carlson et al. | ................ | 47/57.6 |
| 2006/0231000 A1 | 10/2006 | Eastin et al. | | |
| 2007/0062113 A1 | 3/2007 | Rubin et al. | | |

FOREIGN PATENT DOCUMENTS

EP    1 134 583 A    9/2001
JP    2000-236707 A    9/2000

OTHER PUBLICATIONS

International Search Report corresponding to PCT/NL2008/050370, dated Sep. 17, 2008, 3 pages.

* cited by examiner

*Primary Examiner* — David Parsley
(74) *Attorney, Agent, or Firm* — Gilberto M. Villacorta; Sunit Talapatra; Foley & Lardner LLP

(57) ABSTRACT

The present invention relates the methods, compositions and devices for priming of plant seed, preferably seed of crop plants, and seeds obtained with the methods, compositions and devices, wherein the metabolic activity necessary for germination of the seed is not controlled by water but rather by the partial oxygen pressure and/or partial carbon dioxide pressure. In the methods of the invention, the partial oxygen or carbon dioxide pressure may be measured by oxygen/carbon dioxide sensitive fluorescent dye. The invention further relates to processes for producing a primed seed lot of a plant species and to a container comprising primed seed under an atmosphere with a partial oxygen pressure that is below the critical oxygen pressure.

10 Claims, 3 Drawing Sheets

OXYGEN-CONTROLLED PRIMING OF SEED

CROSS-REFERENCE TO RELATED APPLICATIONS

This application is a National Stage of PCT/NL2008/050370, filed Jun. 12, 2008, which claims the benefit and priority from EP 07110105.9, filed Jun. 12, 2007, all of which are incorporated herein by reference in their entirety.

FIELD OF THE INVENTION

The present invention relates to the methods, compositions and devices for priming of plant seed, preferably seed of crop plants, and seeds obtained with said methods, compositions and devices, wherein not water but rather partial oxygen pressure is used to control the priming process.

BACKGROUND OF THE INVENTION

Modern crop production systems require a high degree of precision in crop establishment and seed quality is an important factor therein. Seed quality is a complex trait that is determined by interactions between multiple genetic factors and environmental conditions. Modern approaches to improve seed quality therefore combine classical genetics, plant molecular biology and a variety of seed technologies to enhance physiological quality, vigor and synchronicity to establish uniform high quality crops in the field under diverse environmental conditions.

The commercial need for optimum seed germination performance has led to the development of processes known in the art for zygotic seeds as "seed priming." Seed priming may be a hydration treatment that allows controlled imbibition and induction of the pregerminative metabolism ("activation"), but whereby radicle emergence is prevented. The hydration treatment is stopped before desiccation tolerance is lost. The seeds can be dried back for storage, distribution and planting. Priming enhances germination speed and synchronicity of the seeds and increases seed vigor (short or no "activation" time). Furthermore a wider temperature range for germination, release of dormancy and faster emergence of uniform seedlings is achieved by seed priming. This leads to better crop stands and higher yields.

Four techniques are currently used commercially to accomplish seed priming. These are osmopriming, hydropriming, matrixpriming and pregermination. Osmopriming (osmoconditioning) is the standard priming technique. Seeds are incubated in well aerated solutions with a low water potential, and afterwards washed and dried. The low water potential of the solutions can be achieved by adding osmotiea like mannitol, polyethyleneglycol (PEG) or salts like KCl or $KNO_3$. Hydropriming (drum priming) is achieved by continuous or successive addition of a limited amount of water to the seeds. A drum is used for this purpose and the water can also be applied by humid air. Matrixpriming (matrixconditioning) is the incubation of seeds in the presence of a solid, insoluble matrix (vermiculite, diatomaceous earth, cross-linked highly water-absorbent polymers) with a limited amount of water. This method confers a slow imbibition. Finally, the technique of pregerminated seeds is only possible with a few species. In contrast to classical priming, seeds are allowed to perform radicle protrusion. This is followed by sorting for specific stages, a treatment that reinduces dessication tolerance, and drying. The use of pregerminated seeds results in rapid and uniform seedling development upon imbibition. During the priming of seeds (bio-)chemical compounds may be added as well such as plant hormones (e.g. gibberellins, ethylene), seed dormancy breaking compounds, fungicides etc.

Several technical and logistical difficulties have been encountered with the prior art seed priming techniques. For example, osmotic solutions require continuous aeration and in general, a large volume of priming solution is required per quantity of seeds. Immersion in liquid restricts oxygen absorption and in particular relatively high concentrations of PEG in solution render them viscous and reduce oxygen solubility and diffusion rates. Moreover, priming of large quantities of seed requires large quantities of osmotic (e.g. PEG) solution and this can cause disposal problems, particularly if fungicides have been added. Reductions in percentage seedling emergence have been reported with the use of inorganic salts. Furthermore, matrixpriming has been reported to present difficulties in separating the primed seed from the matrix (e.g. vermiculite). Also reductions in storability of primed seeds as compared to untreated dry seeds has been reported. The methods for priming seed available in the art thus far have in common that they all rely on regulating the level of hydration of the seed, i.e. the water potential, for controlling the priming of the seed. An important problem common to these water-controlled methods is to stop the priming process in the right moment, which depends on the species and the seed batch.

It is an object of the present invention to address the above problems by providing methods, compositions and devices wherein not water but rather partial oxygen pressure is used to control priming of seed.

DESCRIPTION OF THE INVENTION

Definitions

Although in the scientific literature the term germination is often used loosely, herein the term germination is understood to mean the process that starts with water uptake by the seed (imbibition) and that ends with the start of elongation by the embryonic axis, usually the radicle. It includes numerous events, e.g., protein hydration, subcellular structural changes, respiration, macromolecular syntheses, and cell elongation, none of which is itself unique to germination. But their combined effect is to transform an organism having a dehydrated, resting metabolism into an organism having an active metabolism, culminating in growth. Germination sensu stricto therefore does not include seedling growth, which commences when germination finishes. Hence, it is incorrect, for example, to equate germination with seedling emergence from soil since germination will have ended sometime before the seedling is visible. Seed testers often refer to germination in this sense because their interests lie in monitoring the establishment of a vigorous plant of agronomic value. However, physiologists do not encourage such a definition of the term germination but in general acknowledge its widespread use by seed technologists. Herein we will however use the more defined definition wherein germination starts with imbibition and ends with the start of elongation by the embryonic axis. Processes occurring in the nascent seedling, such as mobilisation of the major storage reserves, are also not part of germination: they are postgermination events.

A seed in which none of the germination processes is taking place is herein understood to be quiescent. Quiescent seeds are resting organs, generally having a low moisture content (5-15%) with metabolic activity almost at a standstill. A remarkable property of seeds is that they are able to survive in this state, often for many years, and subsequently resume a normal, high level of metabolism. For germination to occur quiescent seeds generally need only to be hydrated under conditions that encourage metabolism, e.g., a suitable temperature and presence of oxygen.

Components of the germination process, however, may occur in a seed that does not achieve radicle emergence. Even when conditions are apparently favourable for germination so that imbibition, respiration, synthesis of nucleic acids and proteins, and a host of other metabolic events all proceed, culmination in cell elongation does not occur, for reasons that are still poorly understood; such a seed expresses dormancy. Seeds that are dispersed from the parent plant already containing a block to the completion of germination show primary dormancy. Sometimes, a block(s) to germination develops in hydrated, mature seeds when they experience certain environmental conditions, and such seeds show induced or secondary dormancy. Dormant seeds are converted into germinable seeds (i.e., dormancy is broken) by certain "priming" treatments such as a light stimulus or a period at low or alternating temperature which nullify the block to germination but which themselves are not needed for the duration of germination process.

Priming of seed has been defined in the art as controlling the hydration level within seeds so that the metabolic activity necessary for germination can occur but elongation by the embryonic axis, i.e. usually radicle emergence, is prevented. Different physiological activities within the seed occur at different moisture levels (Leopold and Vertucci, 1989, Moisture as a regulator of physiological reactions in seeds. In: Seed Moisture, eds. P. C. Stanwood and M. B. McDonald. CSSA Special Publication Number 14. Madison, Wis.: Crop Science Society of America, pp. 51-69; Taylor, 1997, Seed storage, germination and quality. In: The Physiology of Vegetable Crops, ed. H. C. Wien. Wallingford, U.K.: CAB International, pp. 1-36). The last physiological activity in the germination process is radicle emergence. The initiation of radicle emergence requires a high seed water content. By limiting seed water content, all the metabolic steps necessary for germination can occur without the irreversible act of radicle emergence. Prior to radicle emergence, the seed is considered desiccation tolerant, thus the primed seed moisture content can be decreased by drying. After drying, primed seeds can be stored until time of sowing.

In the present invention not the hydration level but rather the partial oxygen pressure is used to control the germinating seed's metabolism. Herein we therefore use a more general definition of priming. Priming of seed is thus herein defined as controlling the oxygen and hydration level within seeds so that the metabolic activity necessary for germination can occur but elongation by the embryonic axis, i.e. usually radicle emergence, is prevented. The extent to which germination has progressed can be determined roughly, say by measuring water uptake or respiration, but these measurements give us only a very broad indication of what stage of the germination process has been reached. No universally useful biochemical marker of the progress of germination has been found. The only stage of germination that we can time fairly precisely is its termination. Emergence of the axis (usually the radicle) from the seed normally enables us to recognise when germination has gone to completion, though in those cases where the axis may grow before it penetrates through the surrounding tissues, the completion of germination can be determined as the time when a sustained rise in fresh weight begins.

DETAILED DESCRIPTION OF THE INVENTION

In a first aspect, the present invention relates to a method for priming of seed wherein the metabolic activity necessary for germination of the seed is controlled by regulating the partial oxygen pressure and/or the partial carbon dioxide pressure rather than the usual methods wherein the level of hydration of the seed is used to control the metabolic activity of the germinating seed.

Respiration by mature "dry" seeds (usual moisture content: 10-15%) of course is extremely low when compared with developing or germinating seeds, and often measurements are confounded by the presence of a contaminating microflora. When dry seeds are introduced to water, there is an immediate release of gas. This so-called "wetting burst", which may last for several minutes, is not related to respiration, but is the gas that is released from colloidal adsorption as water is imbibed. This gas is released also when dead seeds or their contents, e.g., starch, are imbibed.

The consumption of $O_2$ by many seeds follows a basic pattern although the pattern of consumption by the embryo differs ultimately from that by storage tissues. Respiration in plant seed is considered to involve three or four phases:

Phase 1. Initially there is a sharp increase in $O_2$ consumption, which can be attributed in part to the activation and hydration of mitochondrial enzymes involved in the citric acid cycle and electron transport chain. Respiration during this phase increases linearly with the extent of hydration of the tissue.

Phase 2. This is characterised by a lag in respiration as $O_2$ uptake is stabilised or increases only slowly. Hydration of the seed parts is now completed and all pre-existing enzymes are activated. Presumably there is little further increase in respiratory enzymes or in the number of mitochondria during this phase. The lag phase in some seeds may occur in part because the coats or other surrounding structures limit $O_2$ uptake to the imbibed embryo or storage tissues, leading temporarily to partially anaerobic conditions. Removal of the testa from imbibed pea seeds, for example, diminishes the lag phase appreciably. Another possible reason for this lag is that the activation of the glycolytic pathway during germination is more rapid than the development of mitochondria. This could lead to an accumulation of pyruvate because of deficiencies in the citric acid cycle or oxidative phosphorylation (electron transport chain); hence, some pyruvate would be diverted temporarily to the fermentation pathway, which is not $O_2$ requiring.

Between phase 2 and 3 in the embryo, the radicle penetrates the surrounding structures: germination is completed.

Phase 3. There is now a second respiratory burst. In the embryo, this can be attributed to an increase in activity of newly synthesised mitochondria and respiratory enzymes in the proliferating cells of the growing axis. The number of mitochondria in storage tissues also increases, often in association with the mobilisation of reserves. Another contributory factor of the rise in respiration in both seed parts could be an increased $O_2$ supply through the now punctured testa (or other surrounding structures).

Phase 4. This occurs only in storage tissues and coincides with their senescence following depletion of the stored reserves.

Thus in a preferred method of the invention, there is a reduction in the partial oxygen pressure, and/or an increase in the partial carbon dioxide pressure, at a time and to a level that prevents extension of at least one of root and shoot beyond a point at which the seed cannot be handled without serious risk of damage to the seed. Serious risk of damage of the seed is herein understood any significant reduction (e.g. more than 10, 20 or 50%) in quality of the seed lot with respect to at least one of viability, uniformess of seedling emergence, vigor and uniformess thereof, and crop yield. In a more preferred method of the invention, there is a reduction in the partial oxygen pressure, and/or an increase in the partial carbon dioxide pressure, at a time and to a level that prevents the irreversible act of elongation by the embryonic axis or radicle emergence. The timing of reduction in partial oxygen pressure, and/or an increase in the partial carbon dioxide pressure, is preferably such that it allows all metabolic steps necessary for germination to occur without extension of at least one of root and shoot beyond a point at which the seed cannot be handled without serious risk of damage to the seed, more preferably the irreversible act of radicle emergence, prior to which the seed is considered desiccation tolerant and the primed seed moisture content can thus be decreased by drying. The method of the invention thus preferably comprises the steps of: (a) contacting seed with a sufficient quantity of water and a sufficient quantity of oxygen to allow metabolic activity necessary for germination of the seed to take place; and, (b) at least one of
 (i) a reduction of the partial oxygen pressure; and,
 (ii) an increase in the partial carbon dioxide pressure,
 at a time and to a level that prevents extension of at least one of root and shoot beyond a point at which the seed cannot be handled without serious risk of damage to the seed, more preferably elongation by the embryonic axis or radical emergence in the seed.

It is understood that in the methods of the invention the seed may be contacted with a sufficient quantity of water in any form. The water may be applied in liquid form, e.g. as pure water, watery solutions, including, but not limited to, well known solutions used for seed priming such as solution containing PEG, KCl, $KNO_3$, mannitol and other compounds, and/or the water may be applied in gaseous form e.g. by bringing the seed into contact with a gaseous mixture (e.g. air) with a high relative humidity. Preferably the gaseous mixture has a relative humidity of at least 80, 90, or 95%, more preferably the gaseous mixture is at saturation vapor pressure. Various methods and means for contacting seed with water are available in the art. Such means and methods include e.g. progressive hydration in a rotating drum by water introduced as steam to condense as a mist on the drum walls, as liquid water pumped onto the drum walls to form a surface film, or sprayed onto the seed and/or drum walls (see e.g. U.S. Pat. No. 5,119,589); a semi-permeable membrane apparatus (see e.g. U.S. Pat. No. 5,873,197); treatment with water in a solid matrix (as disclosed e.g. in EP 0 309 551 B1).

It is further understood that in the methods of the invention the seed may be contacted with sufficient quantity of oxygen in any form, i.e. any oxygen-containing gas and/or liquid. Oxygen-containing gas mixtures that may be used may e.g. include air, nitrogen, nobel gases like e.g. helium, neon or argon, carbon dioxide, CO, NO, $NO_2$, $N_2O$, ethylene, ethanol, and/or mixtures of one or more of these.

In a preferred method of the invention, the partial oxygen pressure is reduced by respiration of the metabolically active seed. In this embodiment, the seed, and optionally other respirating cells, are preferably placed in a hermetically sealed space (which may be a container) with a limiting amount of oxygen, whereby the amount of oxygen is such that the oxygen is consumed by respiration to a level that prevents radical emergence just prior to radical emergence. The seed may be placed in the sealed space for all or a part of the priming procedure. Alternatively the space may be sealed for all or a part of the priming procedure. The oxygen level in the hermetically sealed space may be monitored by an oxygen probe using an oxygen sensitive fluorescent dye or any other oxygen measurement device. The necessary amount of oxygen present in the hermetically sealed space at the start of the procedure can be determined and calculated by measuring the amount of oxygen used by seeds during priming up to the moment just prior to radical emergence by e.g. using Q2 technology (WO 01/63264) or any other oxygen measurement device.

In another preferred embodiment, the partial oxygen pressure is reduced by chemical and/or physical removal of the oxygen. Oxygen may be removed chemically by introducing oxygen reactive chemicals into the space containing the priming seed and preferably sealing the space to avoid entry of fresh oxygen. It can be calculated how much oxygen is used by a certain chemical reaction and what will be the result for the oxygen level in a hermetically sealed container. The necessary amount of oxygen reactive chemicals, such as inorganic compounds or enzymes and organic substrates, to achieve a specific oxygen level in the seed containing container at the start of priming process may be placed in the container. A specific form of this may be oxygen removal by a controlled fire in the sealed seed-containing space. Oxygen may be removed physically by replacing oxygen containing gas phase in the seed containing space with a gas or liquid that contains a specific amount of oxygen. These gas mixtures may be prepared by using gas flow mixing devices mixing specific volumes of different pure gasses, such as oxygen, nitrogen, and air. Alternatively, the seed may be placed into a space filled with such a gas, gas mixtures or liquid.

In the methods of the invention, the level of partial oxygen pressure that prevents extension of at least one of root and shoot beyond a point at which the seed cannot be handled without serious risk of damage to the seed, more preferably radical emergence, preferably is less than the critical oxygen pressure. The "critical oxygen pressure" (COP) is herein understood to mean the $pO_2$ below which metabolism (in casu seed metabolism) is inhibited. The critical oxygen pressure is defined by Berry L. J. and Norris W. E. in Biochem. Biophys. Acta. 3:593-606 (1949). Alternatively radical emergence may be prevented by increasing carbon dioxide levels. Elevated carbon dioxide levels are known to decrease respiration of plants (e.g. Qi et al., 1994, New Phytologist, 128:435-442; Reuveni and Gale, 1985, Plant Cell and Environment 8:623-628; Bunce, 1990, Annals of Botany, 65:637-642; Kerbel et al., 1988, Plant Physiol. 86; 1205-1209; Amthor et al., 1992, Plant Physiol. 98:757-760). In general the amount of carbon dioxide that reduces respiration is plant species and plant organ dependent. Levels to be used vary between about 600 and 1200 ppm and may be even higher in some case. In the methods of the invention, the level of partial carbon dioxide pressure that prevents extension of at least one of root and shoot beyond a point at which the seed cannot be handled without serious risk of damage to the seed, more preferably radical emergence, preferably is at least about 300, 600, 1000, 1200, 1500, or 2000 ppm.

In the methods of the invention, the partial oxygen and/or carbon dioxide pressure may be measured by means of a fluorescent dye that is sensitive to oxygen or carbon dioxide, respectively. Optical methods based on fluorescence quenching of fluorescent compounds by oxygen or carbon dioxide are described in WO 01/69243. Suitable fluorescent compounds are described by Bambot et al., 1994, Biotechnology and Bioengineering, 43:1139-1145; Cox and Bunn, 1985, Applied Optics, 24, 2114-2120; Hoist, 1995, Sensor and Actuators B 29: 231-239; Meier et al., 1995, Sensor and Actuators B 29: 240-245; and Marazuele et al., 1998. Appl. Spectrocospy 52:1314-1320. These methods allow to determine the oxygen levels inside a container, preferably without opening it. A sample can be measured over and over again in time, and is not destroyed. Fluorescent dyes with oxygen sensitive fluorescence quenching include e.g. a ruthenium bipyridyl complex, or Tris-$R^{2+}$ 4,7 biphenyl 1,10 phenantrolin. Similarly, in the methods of the invention the partial carbon dioxide pressure may be measured by means of a fluorescent dye that is sensitive to carbon dioxide. A suitable fluorescent dye with carbon dioxide sensitive fluorescence quenching is e.g. tris[2-(2-pyrazinyl)thiazole]ruthenium II (Marazuele et al., 1998, supra).

In another preferred embodiment, the methods of the invention may further comprise the step of drying the seed under conditions and to a moisture content which suspend radicle development but do not result in loss of viability. Seed may e.g. be dried by passing a gas with reduced humidity over the seed. Alternatively seed may surfaced dried with filter paper and/or packed in dry filter paper as indicated in the Examples herein. Preferably during the step of drying the seed, the partial oxygen pressure and/or partial carbon dioxide pressure is kept at a level that prevents radical emergence. However, once the seed are dried to a moisture content which suspends radicle development, the seed may be stored whereby at least one of (a) the partial oxygen pressure; (b) the moisture content of the seed; and (c) partial carbon dioxide pressure; is kept at a level that prevents radical emergence. The seed may be stored under these conditions for prolonged periods of time (e.g. at least one or more weeks, months or years) until being used for sowing.

The methods of the invention may advantageously also be applied to seed that is not tolerant to desiccation, i.e. seed other than desiccation-tolerant seed. In such instance, drying of the seed is preferably avoided, and the method will further comprise the step of storing the seed at a partial oxygen pressure and/or partial carbon dioxide pressure that prevents radical emergence.

In another aspect the invention relates to a process for producing a primed seed lot of a plant species. In the process for producing a primed seed lot preferably a method for priming seed in accordance with the invention as herein defined is applied.

In a further aspect, the invention pertains to a container comprising primed seed under an atmosphere with a partial oxygen pressure that is below the critical oxygen pressure. Preferably the seed comprised in the container is hydrated seed. Hydrated seed is herein understood to be seed with a moisture content that would allow radical emergence if the partial oxygen pressure and/or partial carbon dioxide pressure would be at a level permissible to radical emergence. Preferably, the atmosphere in the container comprises more than 99% nitrogen, nobel gases like e.g. helium, neon or argon, carbon dioxide, CO, NO, $NO_2$, $N_2O$, ethylene, ethanol, and/or mixtures of one or more of these. Other means to fill the space around the seed while maintaining a partial oxygen pressure that is below the critical oxygen pressure are not excluded from the invention. These means may include liquids such as water, watery solutions and/or oils or even solids and combinations of gases, liquids and/or solids.

Oxygen concentrations and specific oxygen levels related to seed physiological, seed chemical and seed processing parameters, including a COP for a particular seed, may be measured by the $Q_2$ Oxygen sensing technology based on the non invasive fluorescence oxygen determination technology to measure metabolic rated in a closed container (EP1134583; WO0169243; US2004033575; CA2403253; and DE60108480T) or any other technology that allows for measuring oxygen consumption of seeds, in the process of producing (said) primed seed. The $Q_2$ may e.g. be used for controlling and/or optimising the oxygen concentration and/or time of oxygen exposure to seeds, and/or defining oxygen concentrations at which seed is primed. The $Q_2$ technology may be implemented in line with the oxygen priming process by providing an integral adaptation to the priming equipment. Specifically, the technology may operate as a fixed or stand alone component to a room or container or other equipment used for means of priming with oxygen and gas mixtures whereby a portal allows light to pass and oxygen levels can be detected with a sensor and an oxygen sensitive fluorescent dye, as described in WO 01/63264 and WO 01/69243.

In this document and in its claims, the verb "to comprise" and its conjugations is used in its non-limiting sense to mean that items following the word are included, but items not specifically mentioned are not excluded. In addition, reference to an element by the indefinite article "a" or "an" does not exclude the possibility that more than one of the element is present, unless the context clearly requires that there be one and only one of the elements. The indefinite article "a" or "an" thus usually means "at least one".

All patent and literature references cited in the present specification are hereby incorporated by reference in their entirety.

The following examples are offered for illustrative purposes only, and are not intended to limit the scope of the present invention in any way.

EXAMPLES

Example 1

Figure 1:
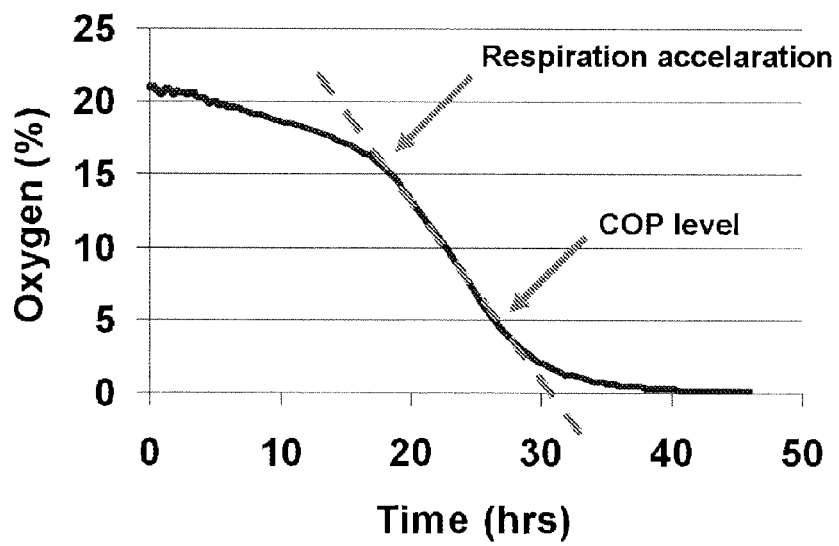
FIG. 1: Oxygen level in time in a closed compartment containing an imbibed seed as measured with the $Q_2$ technology (WO 01/63264). At Time=0 the compartment is hermetically sealed and any use of oxygen by the imbibed seed results in a decrease in oxygen level in the compartment. Hence, the first derivative of the curve is the oxygen consumption rate. These curves contain valuable information on seed physiological properties to be used to determine the protocols for priming seeds according to the described invention. Important parameters derived from such curves in this respect are, among others, the time point at which respiration acceleration occurs, the total amount of oxygen used up to the moment respiration acceleration, the oxygen consumption rate up to the moment of respiration acceleration, the critical oxygen pressure (COP), and the maximal oxygen consumption rate (maximal slope in the curve).

Determination of Oxygen Parameters to be Used During Priming from the Oxygen Consumption Curve During Normal Germination FIG. 1 shows the results of such a determination. Oxygen level in time in a closed compartment containing an imbibed seed (in this case a cabbage seed). Oxygen level was measured using the oxygen measurement method as described in e.g. patent WO 01/63264. The oxygen level decreases steadily in time during the progress of the germination process. In the graph the respiration acceleration time point is indicated (at this point oxygen consumption rate increases). In addition, the COP (critical oxygen pressure) is indicated. At this point the oxygen consumption rate decreases due to lack of oxygen in the compartment.

During priming the respiration acceleration should be avoided (at this point germination progress cannot be reversed anymore). This can be achieved by controlling the oxygen availability to the seeds by setting oxygen levels below COP value. Alternatively, total amount of oxygen present may be calculated from the oxygen used that is necessary to reach the respiration acceleration time point. During the priming not more oxygen than this amount should be added.

Example 2

Figure 2:
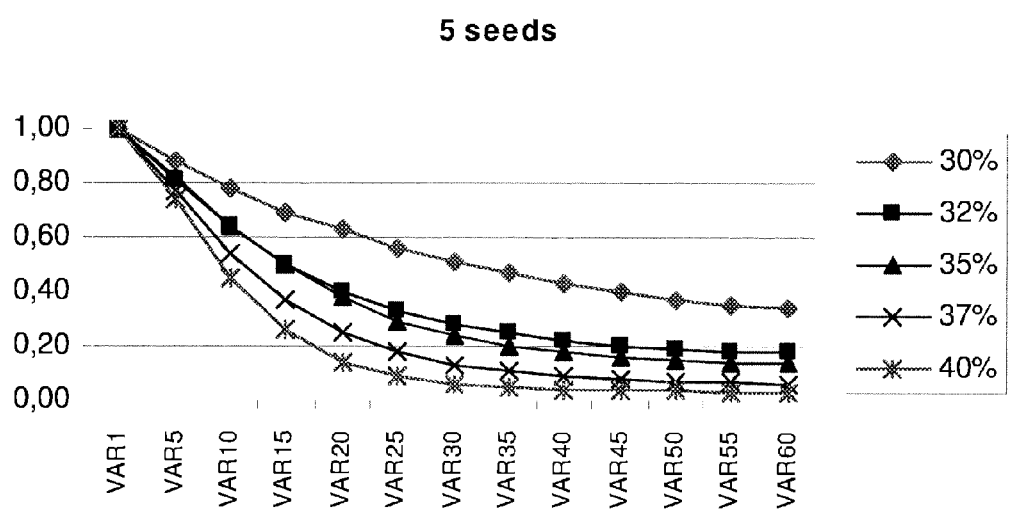
FIG. 2: Relative oxygen level (x-axis) in sealed containers each containing 5 seeds with different moisture levels (as indicated 30, 32, 35, 37 and 40% moisture) in time (y-axis) during priming. Best priming of these seeds is at a moisture content of 37%. From the presented data the oxygen consumption rate suitable for priming of these seeds can be calculated from the curve obtained from seeds with a moisture content of 37%.
Figure 3:
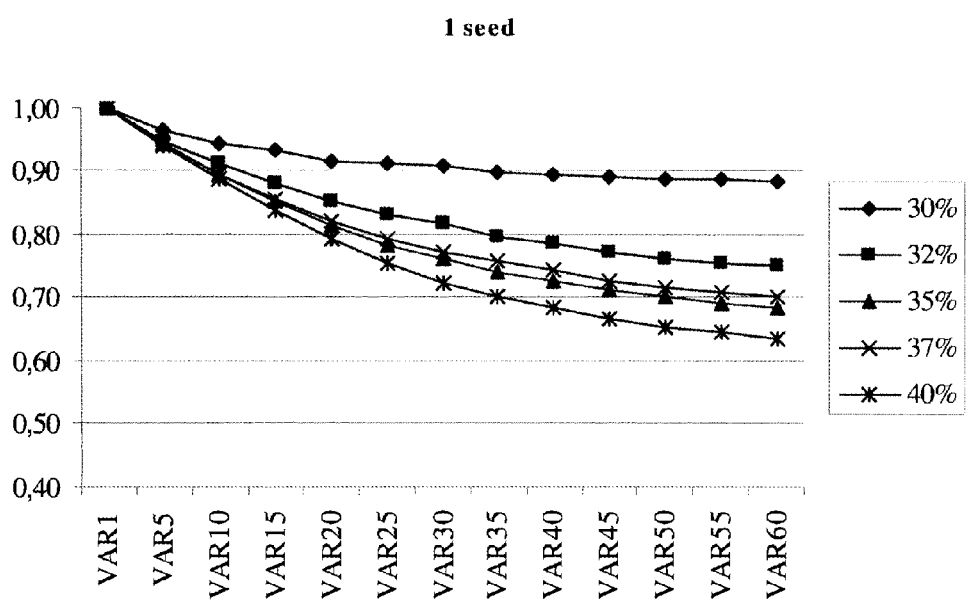
FIG. 3: Similar experiment as described in FIG. 2, but in this case for 1 seed per container.

Determination of Oxygen Parameters to be Used During Priming from the Oxygen Consumption Curve During Priming FIGS. 2 en 3 show the result of such a determination. Relative oxygen level in time (relative scale is indicated) in a closed compartment containing China aster seeds during priming of the seeds was measured with the same method as used in example 1. 5 seeds per compartment are present in FIGS. 2 and 1 one seed per compartment is present in FIG. 3. The different curves show different priming conditions (seeds with different moisture contents). The best priming was obtained with a moisture content between 32% and 35%. From the curves the respiration rate for this condition can be calculated. For optimal priming process control seeds should be restricted to this respiration rate during the priming process by e.g. application of limited oxygen levels.

Example 3

Oxygen Priming of Sugar Beet Seed (I)

Sugar beet seeds with a relatively slow germination and low germination percentage were used in the experiment. The Critical Oxygen Pressure (COP) value of the seeds during germination was about 4%, as determined by oxygen consumption rate germination experiments using the Q2 technology (WO 01/63264).

In the priming process 344 seeds were imbibed on wet filter paper in boxes under continuous flow of air with high humidity (to prevent drying of the seeds) containing 3% oxygen. This treatment was continued for 3 days at 20° C. in the dark. After 3 days the seeds were collected from the boxes. None of the seeds was really germinated, but of 83 seeds the seed cap was lost and in some of these a small part of the route was visible. These seeds were separated from the intact seeds. All seeds were surfaced dried with filter paper and subsequently packed in dry filter paper for further drying during 3 days. After 3 days drying the seeds were tested for germination in 96 wells plates (one seed per well) on agarose surface (15 ml of 0.5% agarose per plate) at 20° C. Besides the primed seeds also control seeds (192) were germinated.

Figure 4:
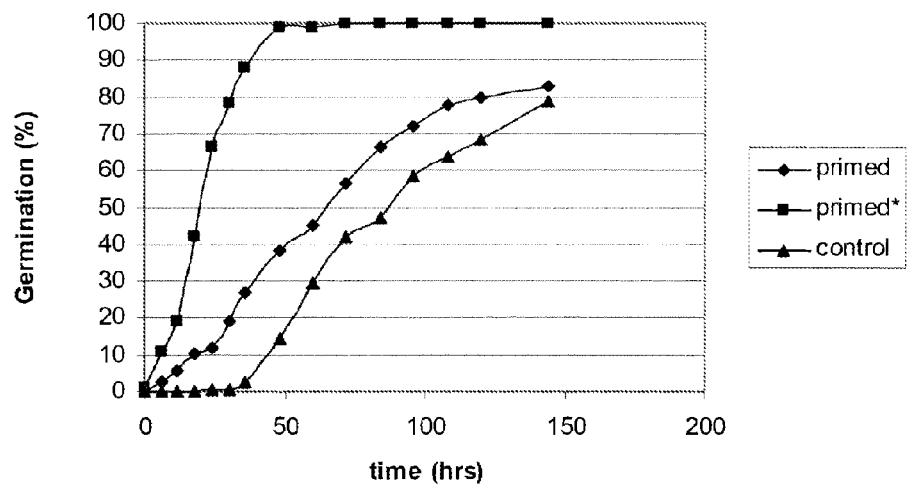
FIG. 4: Germination of control and oxy-primed sugar beet seeds in 3% oxygen. Primed* indicates seeds that lost the seed cap during the priming process. Primed indicates seeds that were morphologically indiscernible after priming from control seeds.
Figure 5:
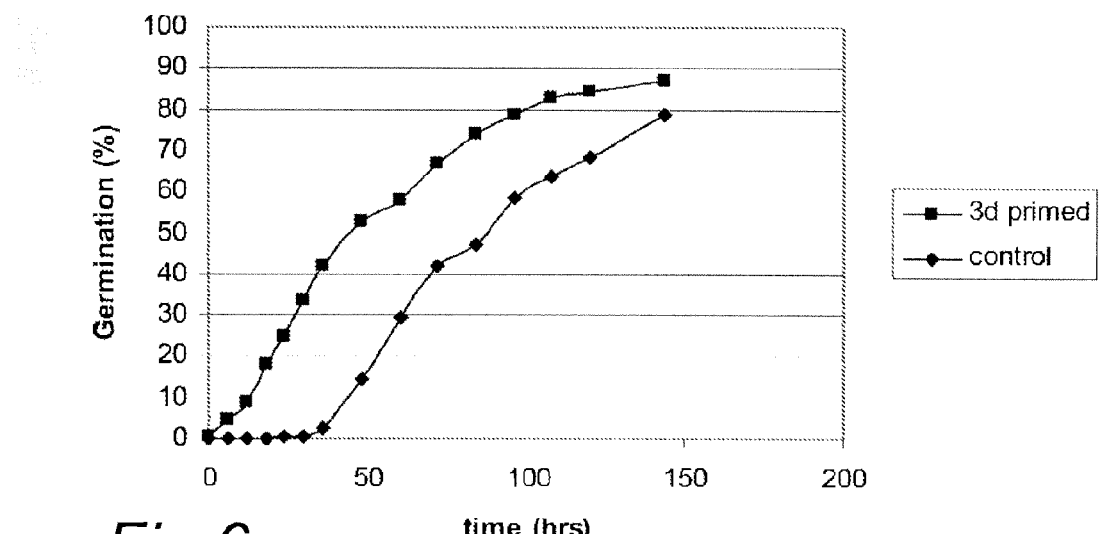
FIG. 5: Germination of control and oxy-primed sugar beet seeds in 3% oxygen. Primed seeds indicated are the sum of all primed seeds as shown in FIG. 4.

The FIGS. 4 and 5 show the germination curves of the three groups of seeds. It can be clearly seen that primed seeds show faster and more complete germination as compared to control seeds.

Example 4

Oxygen Priming of Sugar Beet Seed (II)

Sugar beet seeds with a relatively slow germination and low germination percentage were used in the experiment. The Critical Oxygen Pressure (COP) value of the seeds during germination was about 4%, as determined by oxygen consumption rate germination experiments using the Q2 technology (WO 01/63264).

In the priming process 344 seeds were imbibed on wet filter paper in boxes under continuous flow of air with high humidity (to prevent drying of the seeds) containing 1% oxygen. This treatment was continued for 4 or 5 days at 20° C. in the dark. After 4 (175 seeds) or 5 days (171 seeds) the seeds were collected from the boxes. None of the seeds was germinated. All seeds were surfaced dried with filter paper and subsequently packed in dry filter paper for further drying during 4-5 days. After 4-5 days drying the seeds were tested for germination in 96 wells plates (one seed per well) on agarose surface (15 ml of 0.5% agarose per plate) at 20° C. Besides the primed seeds also control seeds (192) were germinated.

Figure 6:
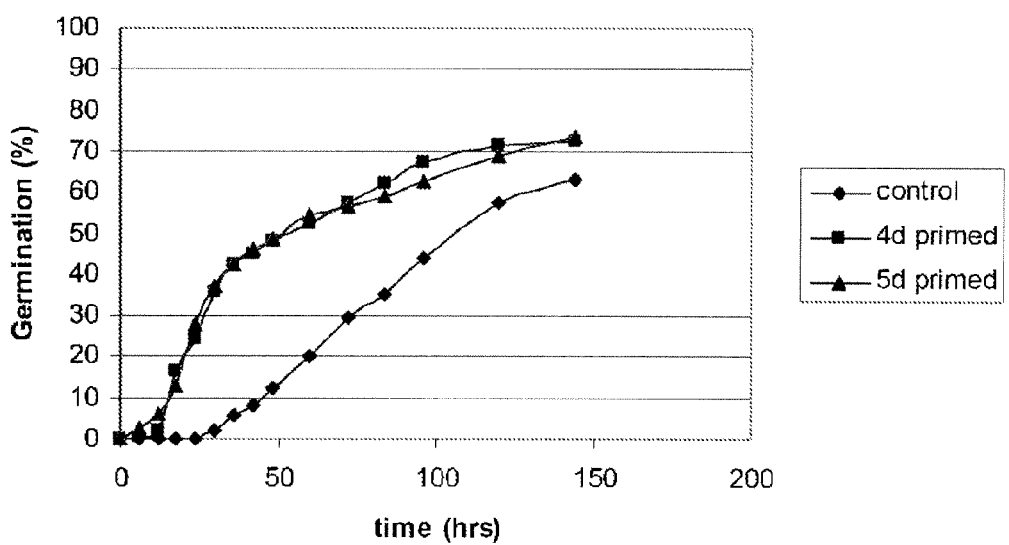
FIG. 6: Germination of control, 4 and 5 days oxy-primed sugar beet seeds in 1% oxygen.

FIG. 6 shows the germination curves of the three groups of seeds. It can be clearly seen that primed seeds show faster and more complete germination as compared to control seeds.

The invention claimed is:

1. A method of priming a seed of a given seed lot comprising:
   (a) measuring for the given seed lot at least:
      (i) the total amount of oxygen used per seed up to the moment of respiration acceleration; and,
      (ii) the critical oxygen pressure;
   (b) contacting the seed with a sufficient quantity of water and a sufficient quantity of oxygen to allow metabolic activity necessary for germination of the seed to take place; and,
   (c) measuring the partial oxygen pressure for the seed lot;
   (d) reducing the partial oxygen pressure to a level below the critical oxygen pressure determined in (a) at a time when the total amount of oxygen used per seed up to the moment of respiration acceleration determined in (a) is reached thereby preventing extension of at least one of root and shoot beyond a point at which the seed cannot be handled without serious risk of damage to the seed.

2. The method according to claim 1, wherein the partial oxygen pressure is reduced by respiration of the metabolically active seed.

3. The method according to claim 2, wherein the partial oxygen pressure is reduced in a hermetically sealed space.

4. The method according to claim 1, wherein the partial oxygen pressure is reduced by chemical or physical removal of oxygen.

5. The method according to claim 1, comprising measuring the partial oxygen pressure by means of an oxygen sensitive fluorescent dye.

6. The method according to claim 1, wherein the method further comprises drying the seed to a moisture content which suspends radical development but does not result in loss of viability.

7. The method according to claim 6, wherein the partial oxygen pressure and/or the partial carbon dioxide pressure is kept at a level that prevents radical emergence during drying.

8. The method according to claim 1, further comprising storing the seed such that at least one of:

a) the partial oxygen pressure;
b) the moisture content of the seed; and,
c) the partial carbon dioxide pressure;
is kept at a level that prevents radical emergence.

9. The method according to claim 1, wherein the seed is not tolerant to desiccation and wherein the method further comprises storing the seed at a partial pressure of oxygen and/or carbon dioxide that prevents radical emergence.

10. The method according to claim 9, wherein the seed is stored under an atmosphere comprising more than 99% of at least one or more of nitrogen, a noble gas, carbon dioxide, CO, NO, $NO_2$, $N_2O$, ethylene, and ethanol.

* * * * *

UNITED STATES PATENT AND TRADEMARK OFFICE
CERTIFICATE OF CORRECTION

PATENT NO.       : 8,381,438 B2
APPLICATION NO.  : 12/663996
DATED            : February 26, 2013
INVENTOR(S)      : Van Duijn et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 361 days.

Signed and Sealed this
First Day of September, 2015

Michelle K. Lee
*Director of the United States Patent and Trademark Office*